United States Patent [19]
Endo et al.

[11] Patent Number: 5,887,079
[45] Date of Patent: Mar. 23, 1999

[54] IMAGE PROCESSING APPARATUS

[75] Inventors: Tsutomu Endo, Amagasaki; Masahiro Kohno, Kobe, both of Japan

[73] Assignee: Sumitomo Metal Industries Limited, Japan

[21] Appl. No.: 594,996

[22] Filed: Jan. 31, 1996

[51] Int. Cl.$^6$ ............................... G06K 9/00; H04N 1/40
[52] U.S. Cl. ..................... 382/169; 711/149; 358/455
[58] Field of Search ................................ 348/222, 254, 348/571, 671, 672, 678; 358/448, 455, 465, 466, 522; 364/920.7; 382/168–172, 276, 307; 365/189.07, 230.05; 711/149

[56] References Cited

U.S. PATENT DOCUMENTS

| | | | |
|---|---|---|---|
| 4,742,551 | 5/1988 | Deering | 382/18 |
| 5,077,808 | 12/1991 | Kumagai | 382/18 |
| 5,086,485 | 2/1992 | Lin | 382/51 |
| 5,201,012 | 4/1993 | Hisano et al. | 382/50 |
| 5,315,409 | 5/1994 | Matsumura et al. | 358/458 |
| 5,553,170 | 9/1996 | Kumagai | 382/283 |

FOREIGN PATENT DOCUMENTS

| | | |
|---|---|---|
| 61-157979 | 7/1986 | Japan . |
| 62-159284 | 7/1987 | Japan . |
| 63-301097 | 12/1988 | Japan . |
| 1-201782 | 8/1989 | Japan . |
| 5-20456 | 1/1993 | Japan . |
| 7-73319 | 3/1995 | Japan . |
| H7-73319 | 3/1995 | Japan . |

*Primary Examiner*—Scott Rogers
*Attorney, Agent, or Firm*—Rossi & Associates

[57] ABSTRACT

In an image processing apparatus, an objective address signal is compared with at least one preceding address signal, provided prior to the objective address signal, to obtain a control signal. A unit of data corresponding to the objective address signal is read from a memory. A processor performs a predetermined processing to the unit of data to obtain renewal data. The renewal data are written to its original address in the memory. According to the control signal, a controller controls reading and writing access to the memory.

10 Claims, 14 Drawing Sheets

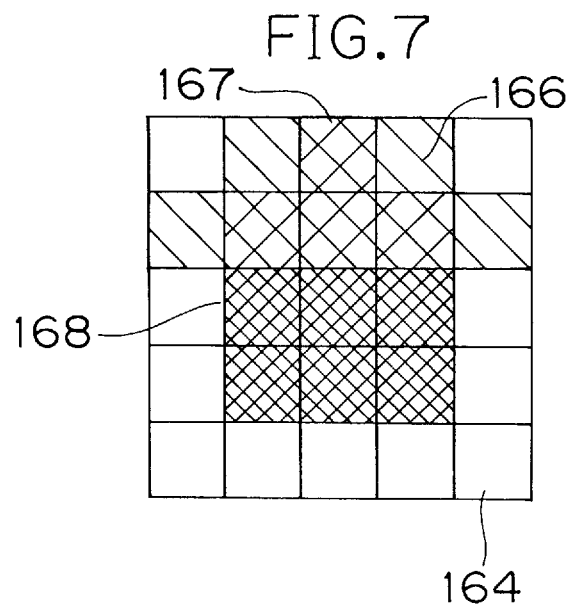
FIG. 7
FIG. 8
| 0 | 1 | 2 | 1 | 0 |
|---|---|---|---|---|
| 1 | 2 | 2 | 2 | 1 |
| 0 | 3 | 3 | 3 | 0 |
| 0 | 3 | 3 | 3 | 0 |
| 0 | 0 | 0 | 0 | 0 |
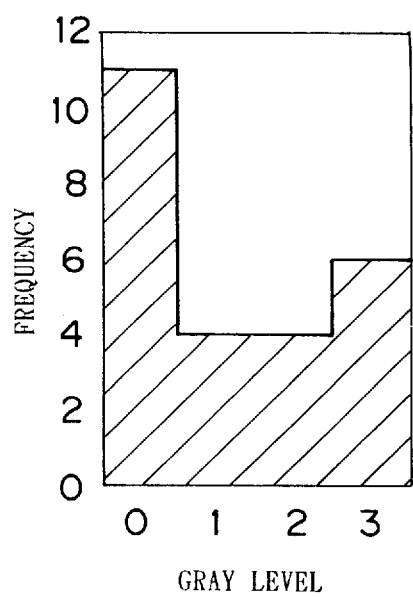
FIG. 10

IMAGE PROCESSING APPARATUS

TECHNICAL FIELD

The present invention relates generally to image processing technology, and more particularly to an apparatus for processing an image represented by a plurality of gray levels (gray-scales).

BACKGROUND ART

Recent developments in image processing technology, especially in digital image processing, have substantially increased the needs of high-speed processing and low power consumption.

In an image processing apparatus, for example, to generate a gray-level (gray-scale) histogram of an image, pixels composing the image are classified according to gray levels, and then the number of pixels of each gray level is counted to obtain a gray level distribution. In order to realize such a histogram processing by hardware, a conventional apparatus includes a memory and an adder incrementing data read from the memory. The memory is provided with a single port to be used commonly both for reading and writing data. In this kind of apparatus, when gray level data for each pixel are supplied as an address signal to the memory, the corresponding data are read from the memory through the port and are incremented by the adder. The incremented data are written to its original address through the port in the memory for renewal. This processing is carried out to each pixel, so that a gray level histogram of the image is finally generated. According to this kind of apparatus, it is difficult to realize real-time processing to an image, represented by a large amount of data, because data are read and written from/to the memory commonly through the single port.

Another conventional apparatus using a dual-port memory has been proposed in Japanese Laying-Open, Kokai H5-20456, although the detail of the apparatus will be later described in the following clause "Detailed Disclosure of the Invention". The apparatus includes a comparator comparing a current address signal with other address signals, provided prior to the current address signal, and a histogram calculator adding a certain number to data read from a memory. The comparator provides a control signal based on the result of comparison. In the apparatus, when the current address signal, that is current gray level data, is equal to either the other address signals, the histogram calculator changes the amount of number to be added to data read from the memory, in response to the control signal. The data, to which the calculation is performed, are written to its original address in said memory to renew the data. Thus processing is repeated so as to generate a gray level histogram of the image. According to this type of apparatus, reading and writing of data from/to the memory can be carried out simultaneously using the two ports; and therefore, real-time processing can be performed. However, electrical power consumption of this apparatus is not low enough, because reading and writing operations are carried out for every pixel of the image.

OBJECTS OF THE INVENTION

Accordingly, an object of the invention is to provide an image processing apparatus which operates with low electrical power consumption.

Another object of the invention is to provide an image processing apparatus which performs high-speed processing of data.

Still another object of the invention is to provide an image processing apparatus which can generate not only a gray level histogram of an image, but also angular moment of the image and the like.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

According to a general aspect of the invention, an image processing apparatus includes a memory which is accessed in response to address signals; a comparator which compares an objective address signal with at least one preceding address signal, provided prior to the objective address signal, to obtain a control signal; means responsive to the objective address signal for reading the corresponding unit of data from the memory; a processor which performs predetermined processing to the unit of data read from the memory to obtain renewal data; means for writing the renewal data to the original address thereof in the memory; and a controller responsive to the control signal for controlling access of the reading means and the writing means to the memory. In this invention, the original address of data means an address in the memory where the data were originally stored before read.

According to a first specific aspect of the invention, an image processing apparatus processes an image composed of a plurality of pixels each represented by a gray level. The apparatus includes a memory which stores image related data, the memory being provided with a read port and a write port; an address generator which provides address signals, each representing a gray level of the corresponding pixel in the image; a comparator which compares an objective address signal with at least one preceding address signal, provided prior to the objective address signal, to obtain a control signal; means responsive to the objective address signal for reading the corresponding unit of data from the memory; a processor which increments the unit of data read from the memory to obtain renewal data; means for writing the renewal data to the original address thereof in the memory; and a controller responsive to the control signal for controlling access of the reading means and the writing means to the memory. The reading means finally reads data stored in the memory to generate a gray level histogram of the image.

According to a second specific aspect of the invention, an image processing apparatus processes an image composed of a plurality of pixels each represented by a gray level and by area number. The apparatus includes a memory which stores image related data, the memory being provided with a read port and a write port; an address generator which provides address signals, each representing an area in the image; a comparator which compares an objective address signal with at least one preceding address signal, provided prior to the objective address signal, to obtain a control signal; means responsive to the objective address signal for reading the corresponding unit of data from the memory; means for providing gray level data representing a gray level of the area represented by the objective address signal; a processor which adds the gray level data to the unit of data read from the memory to provide renewal data; means for writing the renewal data to the original address thereof in the memory; and a controller responsive to the control signal for controlling access of the reading means and the writing means to the memory. The reading means finally reads data stored in the memory to provide output data indicating accumulation of gray level for each area in the image.

According to a third specific aspect of the invention, the apparatus according to the second aspect, further includes a coordinate generator which generates coordinate signals synchronizing input of the address signals and the gray level data; a counter which counts the coordinate signals; and a multiplier which multiplies the output of the counter and the gray level data, representing a gray level of the area represented by the objective address signal. The processor adds the multiplied data, instead of the gray level data, to the unit of data read from the memory to provide the renewal data. The reading means finally reads data stored in the memory to provide an angular first-moment for each area in the image.

According to a fourth specific aspect of the invention, in the apparatus according to the third specific aspect of the invention, the counter includes first and second counter circuits each counting the coordinate signals. The multiplier multiplies the gray level data, representing a gray level of the area represented by the objective address signal, the output of the first counter circuit and the output of the second counter circuit. The reading means finally reads the image related data stored in the memory to provide an angular second-moment for each area in the image.

In each aspect of the invention, preferably, the comparator supplies the control signal when the objective address signal is equal to the preceding address signal. And the controller, in response to the control signal, disables the reading means to read the unit of data, and disables the writing means to write renewal data obtained by processing a unit of data read from the memory in response to the preceding address signal. More preferably, the comparator compares the objective address signal with first and second preceding address signals, provided one and two steps prior to the objective address signal, respectively. And, the controller includes (1) a first flip-flop circuit which holds the unit of data read from the memory in response to the objective address signal; (2) a second flip-flop circuit which holds the renewal data, to be written to the memory; (3) a third flip-flop circuit which holds an output of the second flip-flop circuit; (4) a selector which selects, in response to the control signal, one signal from output signals of the first, second and third flip-flop circuits, the selected signal being to be supplied to the processor; (5) a read control circuit responsive to the control signal for supplying enabling and disabling signals to the read port of the memory; and a write control circuit responsive to the control signal for supplying enabling and disabling signals to the write port of the memory.

BRIEF DESCRIPTION OF THE DRAWINGS

FIG. 7 is an image to be processed for an example by the image processing apparatus of the first preferred embodiment shown in FIG. 6.

FIG. 8 is a diagram showing the distribution of gray level of the image shown in FIG. 7.

FIG. 10 is a histogram of gray level for the image, shown in FIG. 7, generated by the first preferred embodiment.

DETAILED DISCLOSURE OF THE INVENTION

Figure 1:
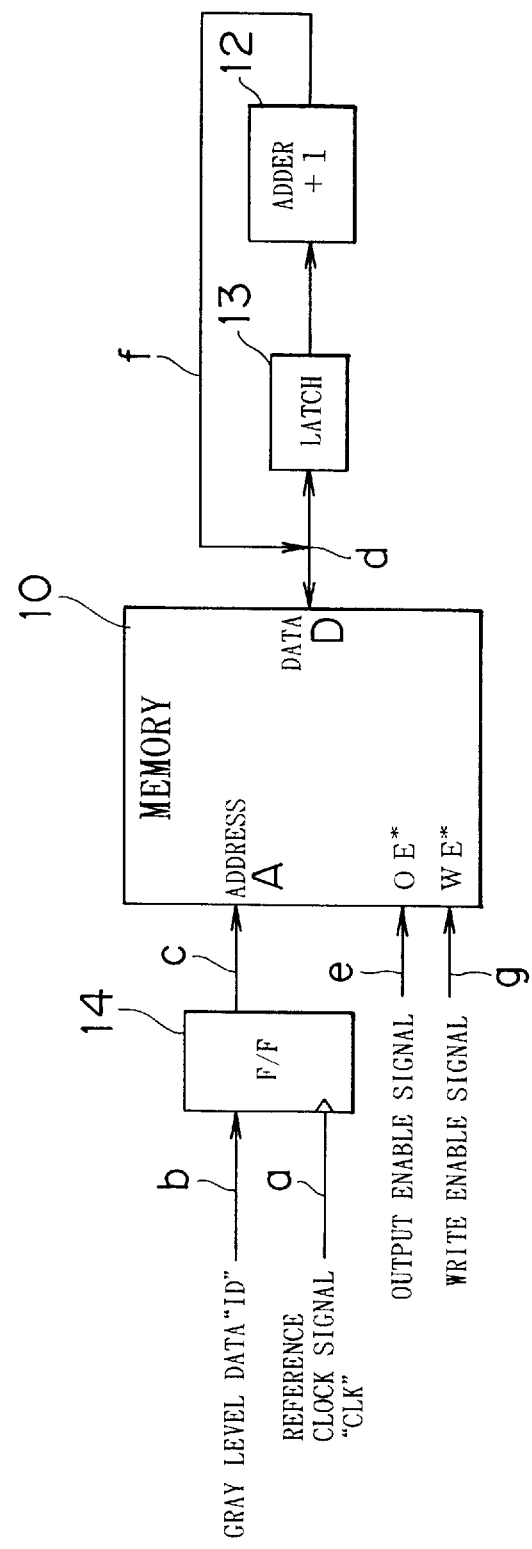
FIG. 1 is a block diagram of a conventional image processing apparatus to be compared to the invention.

For better understanding of the invention, conventional technology is first described in conjunction with FIGS. 1 to 4. FIG. 1 shows a conventional image processing apparatus, which includes a memory 10, a latch circuit 13 connected at an input terminal to a data terminal "D" of the memory 10, an adder 12 connected at input and output terminals to the latch circuit 13 and to the memory 10, respectively, and a flip-flop circuit 14 connected at an output terminal to an address terminal "A" of the memory 10. The memory 10 is a single-port type of memory in which data are read and written commonly from/to the data terminal "D". Gray level data "IDs" are supplied through the flip-flop circuit 14 to the address terminal "A" as address signals. The flip-flop circuit 14 are also supplied with reference clock signals "CLK" together with the gray level data "IDs". The memory 10 stores a plurality of counted data at the addresses, each representing a different gray level.

In the apparatus shown in FIG. 1, when gray level data "ID" for a pixel of an image is supplied as an address to the memory 10, counted data stored at the corresponding address are read and latched at the latch circuit 13 for a short period of time. When the data latched by the latch circuit 13 are supplied to the adder 12, one count (+1) is added to the data, and then the data are written from the data terminal "D" to the original address thereof in the memory 10. By repeating thus operation for each pixel of the image, gray level data are accumulated for each gray level at the corresponding address of the memory 10, so that a gray level histogram of the image can be generated.

Figure 2:
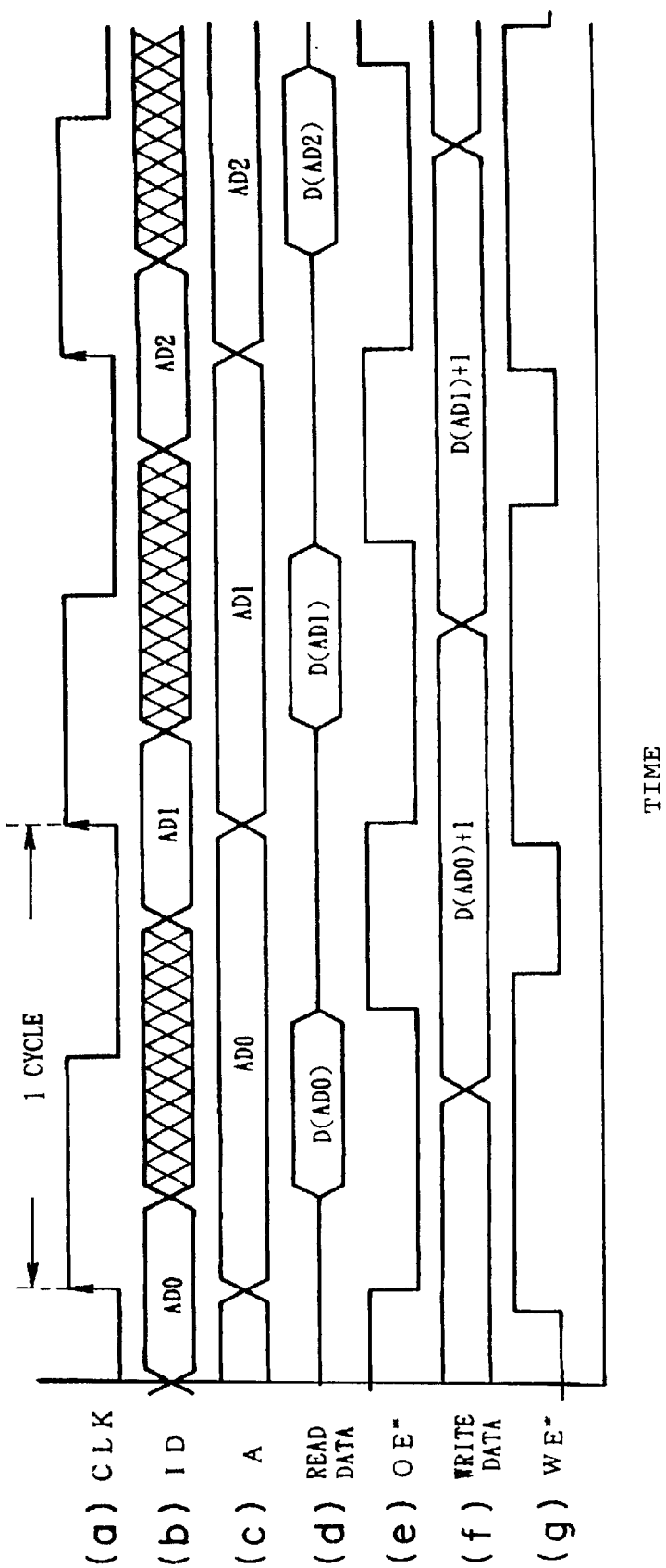
FIG. 2 is a time chart describing operation according to the to conventional apparatus shown in FIG. 1.

FIG. 2 is a time chart showing the operation of the image processing apparatus shown in FIG. 1. Now, detailed operation of the apparatus, shown in FIG. 1, for generating a gray level histogram is again described mainly based on timing of signal variations in level. When a reference clock signal "CLK" is supplied to an input terminal of the flip-flop circuit 14 together with gray level data "ID", as shown in FIGS. 2(a) and (b), the flip-flop 14 holds the gray level data "ID" when the reference clock signal "CLK" becomes high, and then supplies the held data to the address terminal "A" of the memory 10 as an address signal at a timing shown in FIG. 2(c). Data stored at the address represented by the gray level "ID" are read from the terminal "D" of the memory 10, as shown in FIG. 2(d), when an output enabling signal "OE" becomes low, as shown in FIG. 2(e). The read data are supplied from the memory 10 through the latch circuit 13 to the adder 14 so that a count "1" is added to the read data, and the data are supplied to the terminal "D" of the memory 10 at a timing shown in FIG. 2(f). After that, when a write enabling signal "WE" becomes low at a timing shown in FIG. 2(g), the data held at the terminal "D" are written to its original address in the memory 10.

According to the conventional apparatus shown in FIG. 1, because data are read from the memory 10 for performing calculation by the adder 12, and then the calculated data are written to the memory 10, it takes time at least for reading, calculating and writing the data for each processing. Therefore, it is difficult to realize real-time processing for an image represented by a large amount of data.

Figure 3:
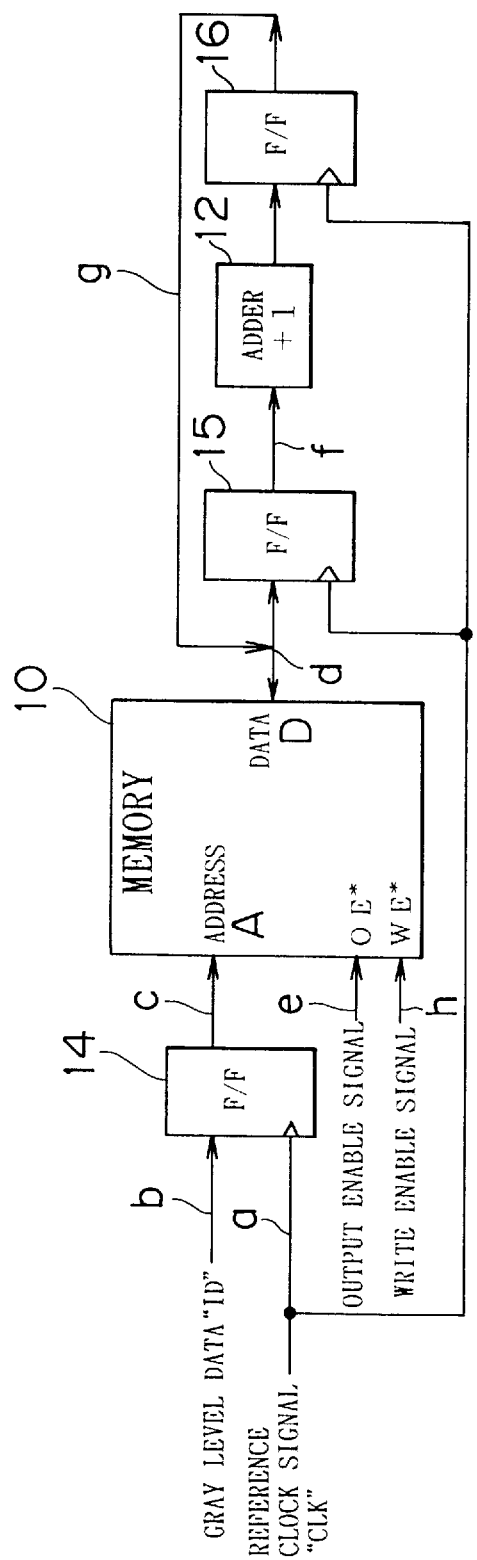
FIG. 3 is a block diagram of another conventional image processing apparatus to be compared to the invention.

FIG. 3 shows another conventional image processing apparatus used for generating a gray level histogram of an image, which is a modification of the apparatus shown in FIG. 1. In these two conventional apparatus, the corresponding elements are symbolized with the same numbers, and the same description is not repeated. That is, the apparatus shown in FIG. 3 is mainly described by explaining the differences from the apparatus shown in FIG. 1. The apparatus includes a flip-flop circuit 15 connected at input and output terminals to the data terminal "D" of the memory 10 and the input terminal of the adder 12, respectively, and a flip-flop circuit 16 connected at input and output terminals to the output terminal of the adder 12 and the data terminal "D" of the memory 10, respectively. Each of the flip-flop circuits 14, 15 and 16 is supplied with reference clock signal "CLK".

Figure 4:
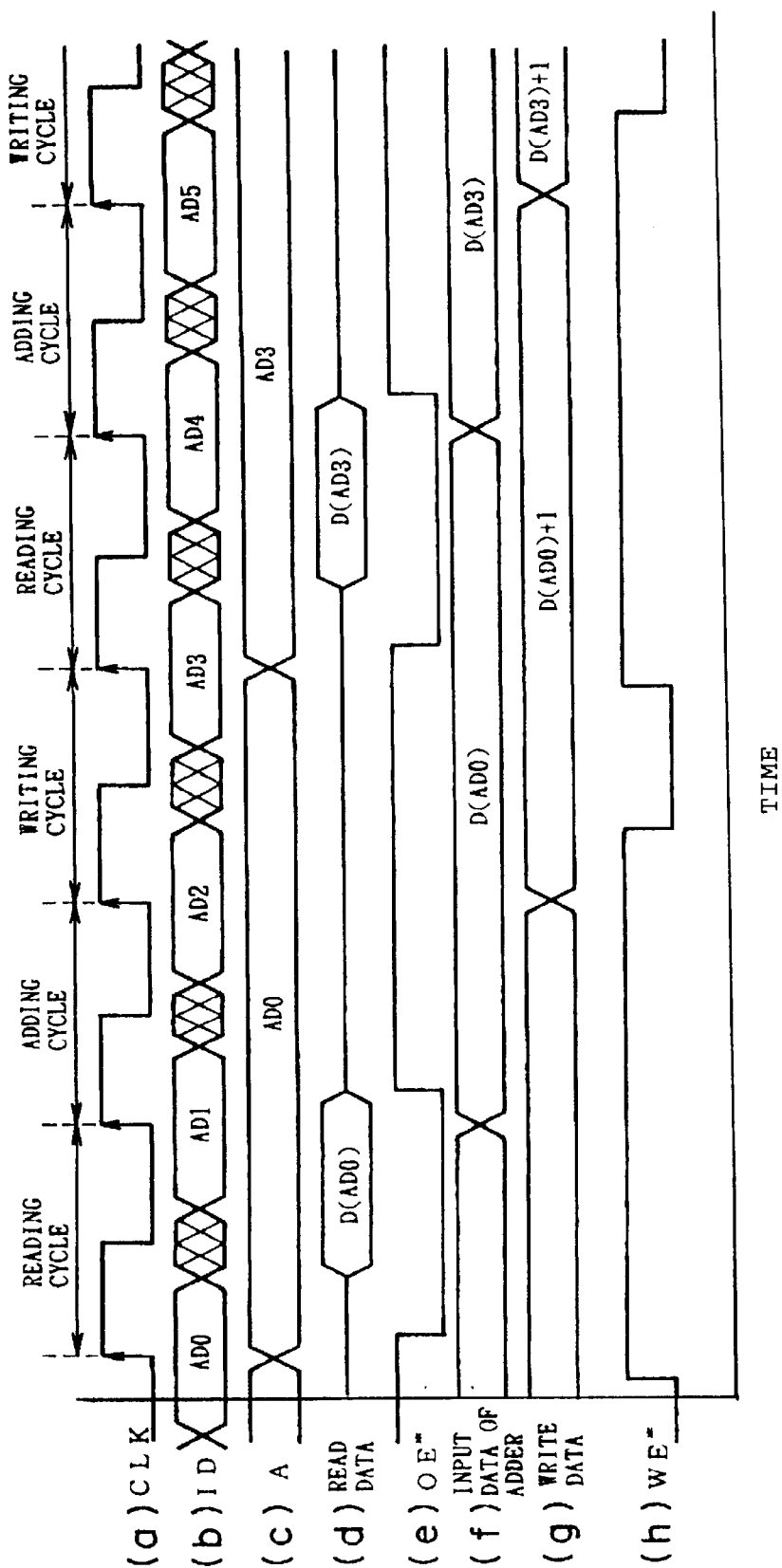
FIG. 4 is a time chart describing operation according to the conventional apparatus shown in FIG. 3.

FIG. 4 is a time chart showing the operation of the image processing apparatus shown in FIG. 3. When the reference clock signal "CLK" is supplied to the flip-flop circuit 14 together with the gray level data "ID", as shown in FIGS. 4(a) and (b), the flip-flop circuit 14 holds the gray level data "ID" when the reference clock signal "CLK" becomes high in level, and then supplies the held data to the address terminal "A" of the memory 10 as an address signal at a timing shown in FIG. 4(c). Data stored at the address corresponding to the gray level "ID" are read from the terminal "D" of the memory 10, as shown in FIG. 4(d), when an output enabling signal "OE" becomes low, as shown in FIG. 4(e). The read data are supplied from the memory 10 to the flip-flop circuit 15 and held thereby at a timing when the reference clock signal "CLK" becomes high in level. Next, the data held by the flip-flop 15 are supplied to the adder 14, as shown in FIG. 4(f) so that a count "1" is added to the data, and the data are held by the flip-flop 16 at a timing when the reference clock signal "CLK" becomes high in level. The data held by the flip-flop 16 are then supplied to the terminal "D" of the memory 10 at a timing shown in FIG. 4(g). After that, when a write enabling signal "WE" becomes low at a timing shown in FIG. 4(h), the data held at the terminal "D" are written to its original address in the memory 10.

The conventional apparatus shown in FIG. 3 needs three clocks for generating a gray level histogram, as shown in FIG. 4(a). Although a clock rate is the longest time in reading time, calculating time and writing time, that is shorter than that by the apparatus shown in FIG. 1, image data to be supplied at the same timing of a clock rate can not be processed at real-time. Therefore, the image is processed for every third pixel.

In order to solve the above mentioned problems of conventional technology shown in FIGS. 1 to 4, an arithmetic unit using a dual-port memory has been proposed in Japanese Laying-Open, Kokai H5-20456. The arithmetic unit includes a gray level data buffer (10) holding input gray level data, a dual-port memory (20) provided with two ports (D0, DI) respectively for reading and writing data, a comparator (50) comparing a current address signal with another address signal previously provided, and a histogram calculator (30) generating a gray level histogram of an image. Each of the input gray level data to be held by the data buffer (10) represents the gray level of a pixel of an image, to which a gray level histogram processing is carried out. The dual-port memory (20) stores a plurality of units of counted data for each gray level of an image, that is, each address of the dual-port memory (20) corresponds to a gray level of an image. The comparator (50) compares the current address signal with the two previous address signals to provide a control signal (CSEL) to be supplied to the histogram calculator (30). The histogram calculator (30) adds a certain amount of number to the counted data read from the dual-port memory (20), and then the counted data are written to its original address in the dual-port memory (20).

In the above mentioned arithmetic unit, when the current address signal, that is input gray level data, is the same as at least one of the two previous address signals, the histogram calculator (30) changes the amount of number to be added to the counted data read from the dual-port memory (20) in response to the control signal (CSEL) supplied from the comparator (50). According to this type of technique, reading and writing of data from/to the memory (20) can be carried out simultaneously; and therefore, real-time processing can be performed. However, electrical power consumption of this apparatus is not low enough, because reading and writing operations are carried out for every pixel of the image.

Figure 5:
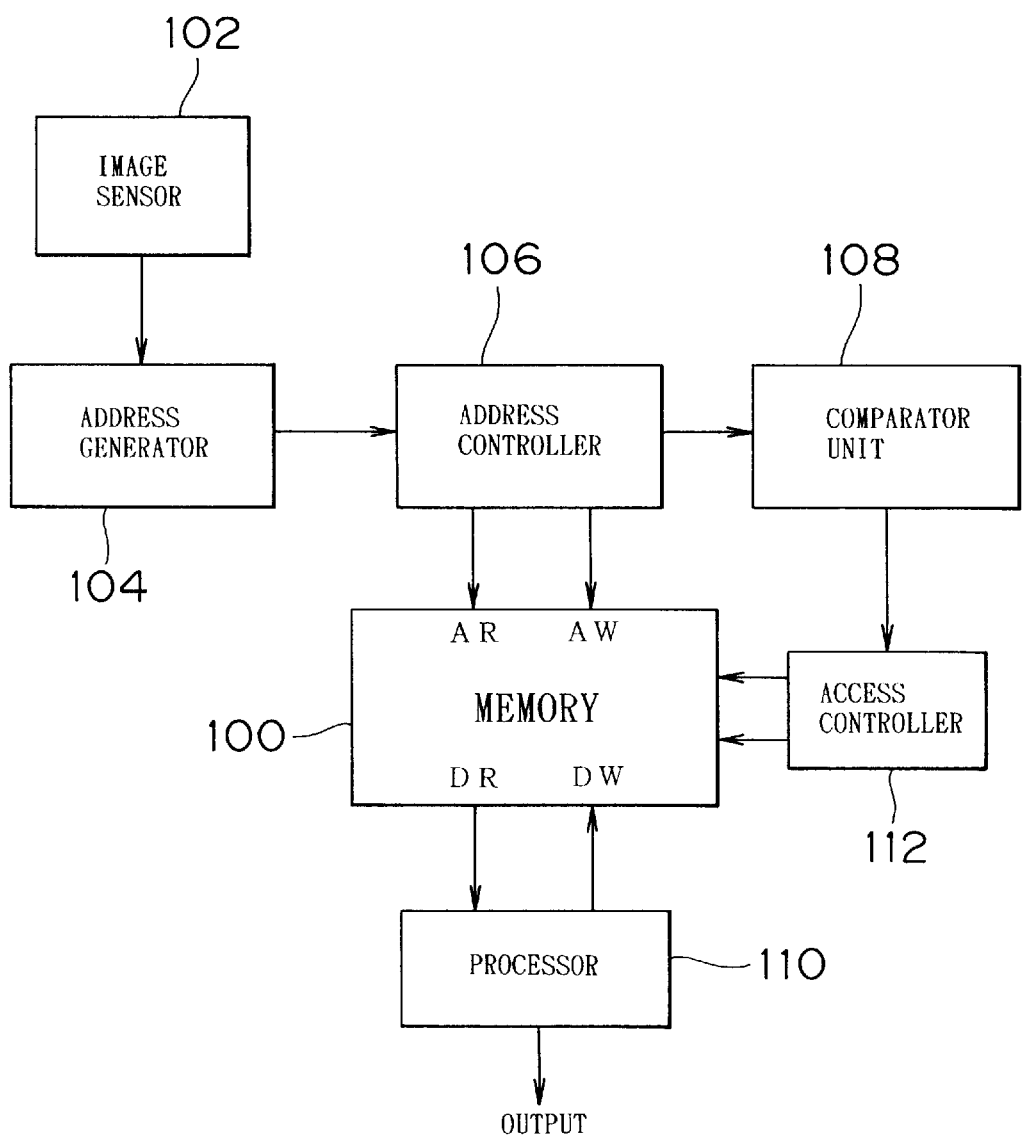
FIG. 5 is a block diagram showing the basic concept of the invention.

Next, the general concept of the invention is first described in conjunction with FIG. 5. An image processing apparatus shown in FIG. 5 is used, for example, for generating a gray level histogram of an image, an angular first-moment of the image, an angular second-moment of the image, etc. The apparatus includes a two-port memory 100 with a read port "DR" and a write port "DW", an image sensor 102 which converts an input image into electrical signals, an address generator 104 which generates address signals in response to electrical signals supplied from the image sensor 102, an address controller 106 which holds the address signals supplied from the address generator 104 and supplies them to the memory 100, a comparator unit 108 connected at an input terminal to the address controller 106, a processor 110 connected to the memory 100 for performing a predetermined processing to data read from the memory, and an access controller 112 connected at input and output terminals to the comparator unit 108 and the memory 100, respectively.

The image sensor 102 may be an image scanner, a CCD (Charge Coupled Device) type of image sensor, or the like. The address generator 104 generates the address signals each representing, for example, a gray level of an pixel of image. The address controller 106 holds at least one address signal, for example two address signals. The comparator unit 108 compares the present address signal (objective address signal) with two preceding address signals, which provided prior to the present address signal. The access controller 112 controls reading and writing access of the processor 110 to the memory 100 in response to an output signal of the comparator unit 108. The processor 110, for example, increments a unit of data read from the memory 100, or adds a predetermined value to data read from the memory 100, etc. The data processed by the processor 110 are written to its original address in the memory 100. The original address means, in this invention, an address where the data are originally stored before being read. By repeating thus operation, a gray level histogram of the image is generated, so that, for example, a gray level threshold of the image can be determined using the gray level histogram.

Figure 6:
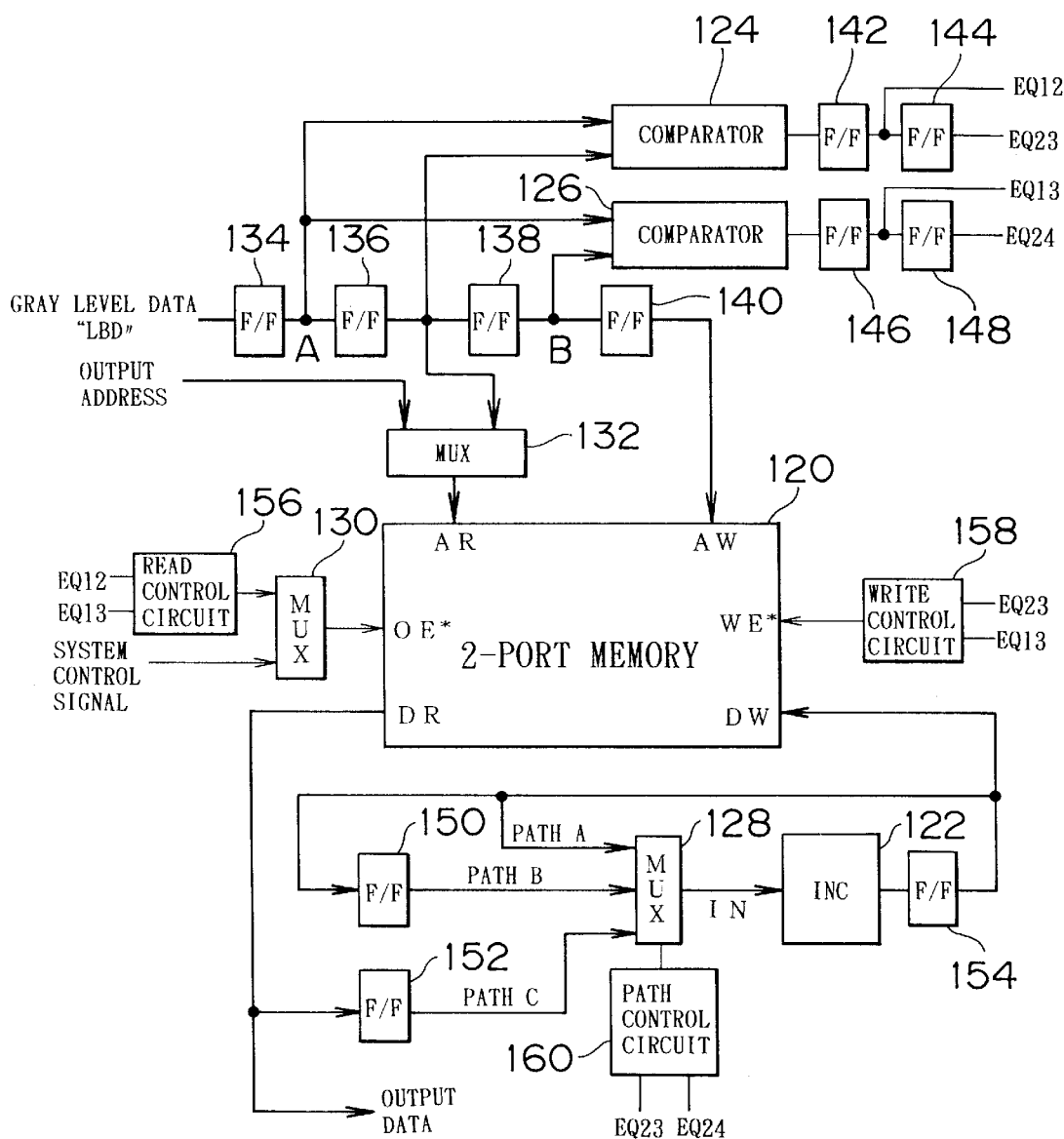
FIG. 6 is a block diagram showing an image processing apparatus of a first preferred embodiment according to the invention.

FIG. 6 shows an image processing apparatus according to a first preferred embodiment of the invention, which is used for generating a gray level histogram of an image (not shown). The apparatus includes a 2-port memory 120, an incrementor 122, two-input type of comparators 124 and 126, multiplexers 128, 130 and 132, flip-flop circuits 134, 136, 138, 140, 142, 144, 146, 148, 150, 152 and 154, a read control circuit 156, a write control circuit 158, and a path control circuit 160. The flip-flop circuit 134 is supplied with a plurality of units of gray-level data "LBDs" as input signals, each representing a gray level of a pixel (area) of the image. Each of the flip-flop circuits 134, 136, 138, 140, 142, 144, 146, 148, 150, 152 and 154 operates in synchronization with image clock signals.

The flip-flop circuits 134, 136, 138 and 140 are connected in series, in which the flip-flop 134 is connected at an output terminal both to an input terminal of the comparator 124 and an input terminals of the comparator 126, the flip-flop circuit 136 is connected at an output terminal both to the other input terminal of the comparator 124 and to an input terminal of the multiplexer 132, the flip-flop circuit 138 is connected at an output terminal to the other input terminal of the comparator 126, and the flip-flop circuit 140 is connected at an output terminal to an address write terminal "AW" of the two-port memory 120. The multiplexer 132 is supplied at the other input terminal with an output address for reading data from the memory 120 as a histogram, and is connected at an output terminal to an address read terminal "AR" of the two-port memory 120. The comparator 124 is connected at an output terminal to an input terminal of the flip-flop circuit 142, which is connected to the flip-flop circuit 144 in series. The comparator 126 is connected at an output terminal to an input terminal of the flip-flop circuit 146, which is connected to the flip-flop circuit 148 in series. Each of the comparators 124 and 126 supplies an output signal of high level when the two input signals are the same as each other, and supplies an output signal of low level when the two input signals are different from each other.

An output signal "EQ12" of the flip-flop circuit 142 is supplied to one of input terminals of the read control circuit 156. An output signal "EQ23" of the flip-flop circuit 144 is supplied to one of input terminals of the write control circuit 158 and to one of input terminals of the path control circuit 160. An output signal "EQ13" of flip-flop circuit 146 is supplied to the other input terminal of the read control circuit 156 and to the other input terminal of the write control circuit 158. An output signal of the flip-flop "EQ24" of flip-flops 148 is supplied to the other input terminal of the path control circuit 160.

The multiplexer 130 is connected at one of input terminals to an output terminal of the read control circuit 156, and at an output terminal to an output enabling terminal "OE" of the two-port memory 120. The multiplexer 130 is provided at the other input terminal with a system control signal. The write control circuit 158 is connected at an output terminal to a write enabling terminal "WE" of the two-port memory 120.

The flip-flop circuit 150 is connected at an input terminal to an output terminal of the flip-flop circuit 154, and at an output terminal to one of three input terminals of the multiplexer 128. The flip-flop circuit 152 is connected at an input terminal to a data-read terminal "DR" of the two-port memory 120, and at an output terminal to another input terminal of the multiplexer 128. The flip-flop circuit 154 is connected at an input terminal to an output terminal of the incrementor 122, and at an output terminal to the other input terminal of the multiplexer 128 and to a data-write terminal "DW" of the two-port memory 120. The multiplexer 128 is connected at an output terminal to an input terminal of the incrementor 122, and at an control terminal to an output terminal of the path control circuit 160.

The read control circuit 156 generates an output enabling signal in response to the output signals ("EQ12" and "EQ13") of the flip-flop circuit 142 and 146. In more detail, the read control circuit 156 supplies an output enabling signal of low level, that is active, when both the signals "EQ12" and "EQ13" are low in level, that is, when an output of the flip-flop circuit 136 is the same as none of outputs of the flip-flop circuits 138 and 140. Exceptionally, the read control circuit 156 supplies an output enabling signal of low level independently of the level of the signals "EQ12" and "EQ13", when the first effective signal is supplied as an address signal of the memory 120. Further, the read control circuit 156 also supplies an output enabling signal of low level independently of the level of the signal "EQ13" as long as the signal "EQ12" is low, when the second effective signal is supplied as an address signal of the memory 120. In other words, the read control circuit 156 supplies an output enabling signal of high level, that is inactive, independently of the level of "EQ13" as long as the signal "EQ12" is high, when the second effective signal is supplied as an address signal of the memory 120.

The write control circuit 158 generates a write enabling signal in response to the output signals ("EQ23" and "EQ13") of the flip-flop circuit 144 and 146. In more detail, the write control circuit 158 supplies a write enabling signal of low level, that is active, when both the signals "EQ23" and "EQ13" are low, that is, when an output of the flip-flop circuit 140 is the same as none of outputs of the flip-flop circuits 136 and 138. Exceptionally, the write control circuit 158 supplies an output enabling signal of low level independently of the level of the signals "EQ23" and "EQ13", when the last effective signal is supplied as an address signal of the memory 120. Further, the write control circuit 158 also supplies an output enabling signal of low level independently of the level of the signal "EQ13" as long as the signal "EQ23" is low, when the second last signal is supplied as an address signal of the memory 120. In other words, the write control circuit 158 supplies an output enabling signal of high level, that is inactive, independently of the level of the signal "EQ13" as long as the signal "EQ23" is high, when the second last signal is supplied as an address signal of the memory 120.

The path control circuit 160 controls the multiplexer 128 in response to the output signals "EQ23" and "EQ24" of the flip-flop circuits 144 and 148. In more detail, the path control circuit 160 makes the multiplexer 128 connect the output of the flip-flop 154 to the input of the incrementor (INC) 122 independently of the level of the signal "EQ24", as long as the signal "EQ23" is high, that is, when outputs of the flip-flop circuits 136 and 138 are the same in level as each other. The path control circuit 160 makes the multiplexer 128 connect the output of the flip-flop circuit 150 to the input of the incrementor 122 when the signals "EQ23" and "EQ24" are low and high, respectively, that is, when the flip-flop circuits 136 and 138 have the different outputs and the flip-flop circuit 136 and 140 have the same outputs. The path control circuit 160 makes the multiplexer 128 connect the output of the flip-flop 152 to the input of the incrementor 122 when both the signals "EQ23" and "EQ24" are low, that is, when the flip-flop circuits 136 and 138 have the different outputs and the flip-flop circuits 136 and 140 have the different outputs as well. Exceptionally, the path control circuit 160 makes the multiplexer 128 connect the output of the flip-flop circuit 152 to the incrementor 122 independently of the levels of the signals "EQ23" and "EQ24" when the first effective data are held by the flip-flop circuit 138. Further, the path control circuit 160 makes the multiplexer 128 connect the output of the flip-flop 152 to the incrementor 122 independently of the level of the signal "EQ24" as long as the signal "EQ23" is low in level when the second effective data are held by the flip-flop circuit 138. In other words, the output of the flip-flop 152 is connected to the incrementor 122 independently of the level of the signal "EQ24" when the signal "EQ23" is high in level.

Next, broad outline of operation for generating a gray level histogram of the image, according to the apparatus shown in FIG. 6 is described using a simple example of an image shown in FIG. 7 for easier understanding. Assuming that, the image shown in FIG. 7 is illustrated as composed of twenty-five pixels with four different gray levels "0" to "3", as shown in FIG. 8. In FIG. 7, reference numbers 164, 166, 167 and 168 represent pixels illustrated with gray levels of "0", "1 or 2" and "3", respectively.

First, the contents of the two-port memory 120 are cleared to zero using, for example, a clear terminal (not shown) or controlling of a CPU (not shown). Next, a gray level histogram is generated. In this processing, the multiplexers 130 and 132 are controlled to supply an output signal of the read control circuit 156 to the output enable terminal "OE*", and to supply an output signal of the flip-flop circuit 136 to the address read terminal "AR". The flip-flop circuit 134 is supplied with gray level data "LBD" in synchronization with the image clock signal.

Figure 9:
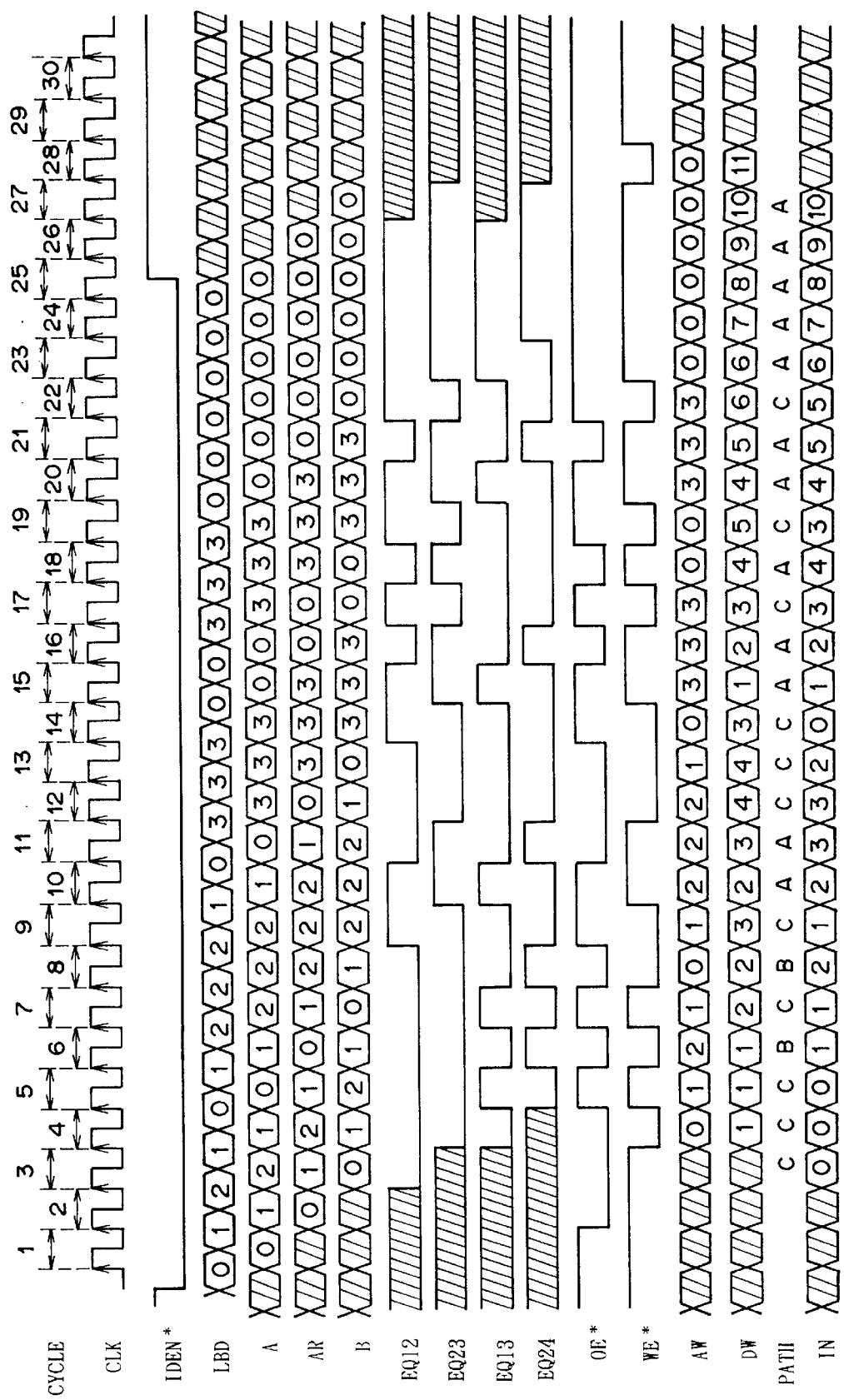
FIG. 9 is a time chart describing operation of the first preferred embodiment shown in FIG. 6.

FIG. 9 is a time-chart for generating a gray level histogram of the image, in which the gray level data shown in FIG. 8 are inputted to the apparatus by raster-scanning technique. In the time-chart, symbols "CLK" and "LBD" indicate image clock signal and gray level data, respectively. A symbol "IDEN*" indicates a signal representing whether the signal "LBD" is enabling, that is, the signal "LBD" is processed when the signal "IDEN" is active, low level. Symbols "A", "AR", "B", "AW", "DW" and "IN" respectively represent an output of the flip-flop circuit 134, an output of the flip-flop circuit 136 that is a read address of the memory 120, an output of the flip-flop circuit 138, an output of the flip-flop circuit 140 that is a write address of the memory 120, data to be written to the memory 120, that is the output of the flip-flop circuit 154, and an input of the incrementor 122 that is an output of the multiplexer 128. Numerals shown within waveforms represent the corresponding data values indicated by the decimal system.

In gray level histogram processing according to the first preferred embodiment, when the present gray level data (LBD) are provided in synchronization with the image clock signal "CLK", the present gray level data are compared with the last and the second last gray level data, provided one and two clocks prior to the present data, respectively. When the present gray level data supplied as a read address is the same as none of the two previous, the last and second last, gray level data, a unit of image data corresponding to the present gray level data (address signal) is read from the memory 120 and held by the flip-flop circuit 152. In other words, when the output of the flip-flop circuit 136 is the same as none of the output of the flip-flop circuit 138 and the output of the flip-flop circuit 140, that is, when both signals "EQ12" and "EQ13" are low in level, the image data specified by the present gray level data (address signal) are read from the memory 120.

In next cycle ("EQ23"="EQ24"=LOW), the path control circuit 160 controls the multiplexer 128 to transmit an output signal of the flip-flop circuit 152 to the incrementor 122.

If the present gray level data, which is an address signal for the memory 120, is the same as the last gray level data provided one clock prior to the present gray level data, no histogram data corresponding to the present gray level data are read from the two-port memory 120, because the corresponding histogram data are held by the flip-flop circuit 154. In other words, if the output of the flip-flop circuit 136 is equal to the output of the flip-flop circuit 138, that is when the signal "EQ12" is high in level, no histogram data corresponding to the present gray level data are read from the memory 120. Subsequently, the output of the flip-flop circuit 154 is transmitted to the incrementor 122 in the next cycle where the signal "EQ23" becomes high in level.

If the present gray level data are equal to the second last gray level data, provided two clocks prior to the present gray level data, but different from the last gray level data, provided one clock prior to the present gray level data, no histogram data corresponding to the present gray level data are read from the memory 120, because the corresponding histogram data are held by the flip-flop circuit 150. In other words, if the output of the flip-flop circuit 136 is equal to the output of the flip-flop circuit 140, but different from the output of the flip-flop circuit 138, that is, signals "EQ13" and "EQ12" are high and low in level, respectively, no histogram data corresponding to the present gray level data are read from the memory 120. Subsequently, the output of the flip-flop circuit 150 is transmitted to the incrementor 122 in the next cycle where the signals "EQ24" and "EQ23" become high and low in level, respectively.

In writing operation to the two-port memory 120, when the output of the flip-flop 140 is equal to none of the outputs of the flip-flop circuits 136 and 138, that is, when both the signals "EQ23" and "EQ13" are low in level, the output of the flip-flop circuit 154 is written to the two-port memory 120. In another case that the outputs of the flip-flop circuits 140 and 138 are equal to each other, that is when the signal "EQ23" is high in level, no data are written to the two-port memory 120, because the corresponding data can be written in the following cycle. In another case that the outputs of the flip-flop circuits 140 and 136 are equal to each other, that is when the signal "EQ13" is high in level, no data are written to the two-port memory 120, because the corresponding data can be written two cycle later. By repeating thus operation, frequency of each gray level is automatically generated in the memory 120. The gray level histogram of the image is outputted from the two-port memory 120 by controlling the multiplexers 130 and 132.

The above operation is now more specifically described in conjunction with the flow chart shown in FIG. 9. In processing of the first effective gray level data "0", when an image data effective signal "IDEN*" becomes active, low in level, in cycle 1, the first effective gray level data "0" are provided in synchronization with clock signal "CLK" and held by the flip-flop circuit 134 (see "A" in FIG. 9).

In cycle 2, when the first effective gray level data "0" are supplied to the two-port memory 120 as a read address signal "AR", signal "OE*" becomes active to read the corresponding histogram data from the two-port memory 120. In this reading operation, the histogram data are read from the memory independently of the levels of signals "EQ12" and "EQ13", respectively representing the results of comparison with the last and second last gray level data provided one and two clocks prior to the first effective gray level data.

In cycle 3, the histogram data read from the memory 120 are held by the flip-flop circuit 152, and then, a path "C " is selected to transmit the output of the flip-flop 152 to the incrementor 122 independently of the levels of the signals "EQ23" and "EQ24". The incrementor 122 increments the histogram value "0" of the first effective gray level data "0" to obtain a renewal histogram value "1".

In cycle 4, the histogram value "1" is held by the flip-flop circuit 154, while the flip-flop circuit 140 holds the first effective gray level data "0". No gray level data entered in cycles 2 and 3 are equal to the first effective gray level data "0", as shown in FIG. 9, so that the write signal "WE*" becomes active to write the histogram value "1" held by the flip-flop circuit 154 to its original address in the two-port memory 120.

Next, in processing of the second effective gray level data "1", the second effective gray level data "1" are held by the flip-flop circuit 134 (see "A" in FIG. 6) in cycle 2. In cycle 3, when the second effective gray level data "1" are supplied to the two-port memory 120 as the read address signal "AR", signal "OE*" becomes active to read the corresponding histogram data from the two-port memory 120, because the second effective gray level data "1" is different from the first effective gray level data "0" provided one clock (cycle) prior thereto independently of the signal "EQ13" indicating comparison result with gray level data provided two cycle prior thereto. In response to the signal "OE*" of low level, the corresponding histogram value "0" is read from the memory 120.

In cycle 4, the histogram value "0" for the second effective gray level data "1" is held by the flip-flop circuit 152, and path "C" is selected independently of the signal "EQ24" to transmit the output of the flip-flop circuit 152 through the multiplexer 128 to the incrementor 122. The incrementor 122 increments the histogram value "0" of the second effective gray level data "1" to obtain a renewal histogram value "1".

In cycle 5, the histogram value "1" is held by the flip-flop circuit 154, while the flip-flop circuit 140 holds the second effective gray level data "1". The write signal "WE*" becomes inactive, because another gray level data of "1", which is equal to the second effective gray level data, are entered two cycle later (cycle 4). Therefore, the histogram value "1" held by the flip-flop circuit 154 is not written to the two-port memory 120 at this time.

Next, in processing of the fourth effective gray level data "1", the fourth effective gray level data "1" are held by the flip-flop circuit 134 (see "A" in FIG. 6) in cycle 4. In cycle 5, when the fourth effective gray level data "1" are supplied to the two-port memory 120 as the read address signal "AR", signal "OE*" becomes inactive to read no data from the two-port memory 120, because the fourth effective gray level data "1" is equal to the second effective gray level data "1" entered two clock (cycle) prior thereto. At this time, a histogram value "1" corresponding to the second effective gray level data "1" is held by the flip-flop circuit 154.

In cycle 6, the output of the flip-flop circuit 154 is transmitted to the flip-flop circuit 150, then a path "B" is selected to transmit the output of the flip-flop circuit 150 to the incrementor 122. The incrementor 122 increments the histogram value "1" of the second effective gray level data "1" to obtain a renewal histogram value "2" for the fourth effective gray level data "1".

In cycle 7, the histogram value "2" is held by the flip-flop circuit 154, while the flip-flop circuit 140 holds the fourth effective gray level data "1". The write signal "WE*" becomes inactive, because another gray level data of "1", which is equal to the fourth effective gray level data, are entered two cycle later (cycle 6). Therefore, the histogram value "2" held by the flip-flop circuit 154 is not written to the two-port memory 120 at this time.

The above mentioned operation is carried out for each gray level data corresponding to each of pixels (5×5=25) composing the objective image, so that a gray level histogram of the image is generated, as shown in FIG. 10. It can be understood from FIG. 9, especially from the chart for signal "OE*" and "WE*", according to the first preferred embodiment, the gray level histogram of the image, shown in FIG. 7, is generated by eleven times reading of data and eleven times writing of data from/to the two-port memory 120. In other words, it is not necessary to access the memory pixel-by-pixel, so that power consumption of the memory 120 can be decreased dramatically as compared to the above mentioned conventional technology. According to the conventional technology, a gray level histogram of the image shown in FIG. 7 is generated by twenty-five times reading of data and twenty-five times writing of data from/to a memory, because it is necessary to access the memory pixel-by-pixel.

Figure 11:
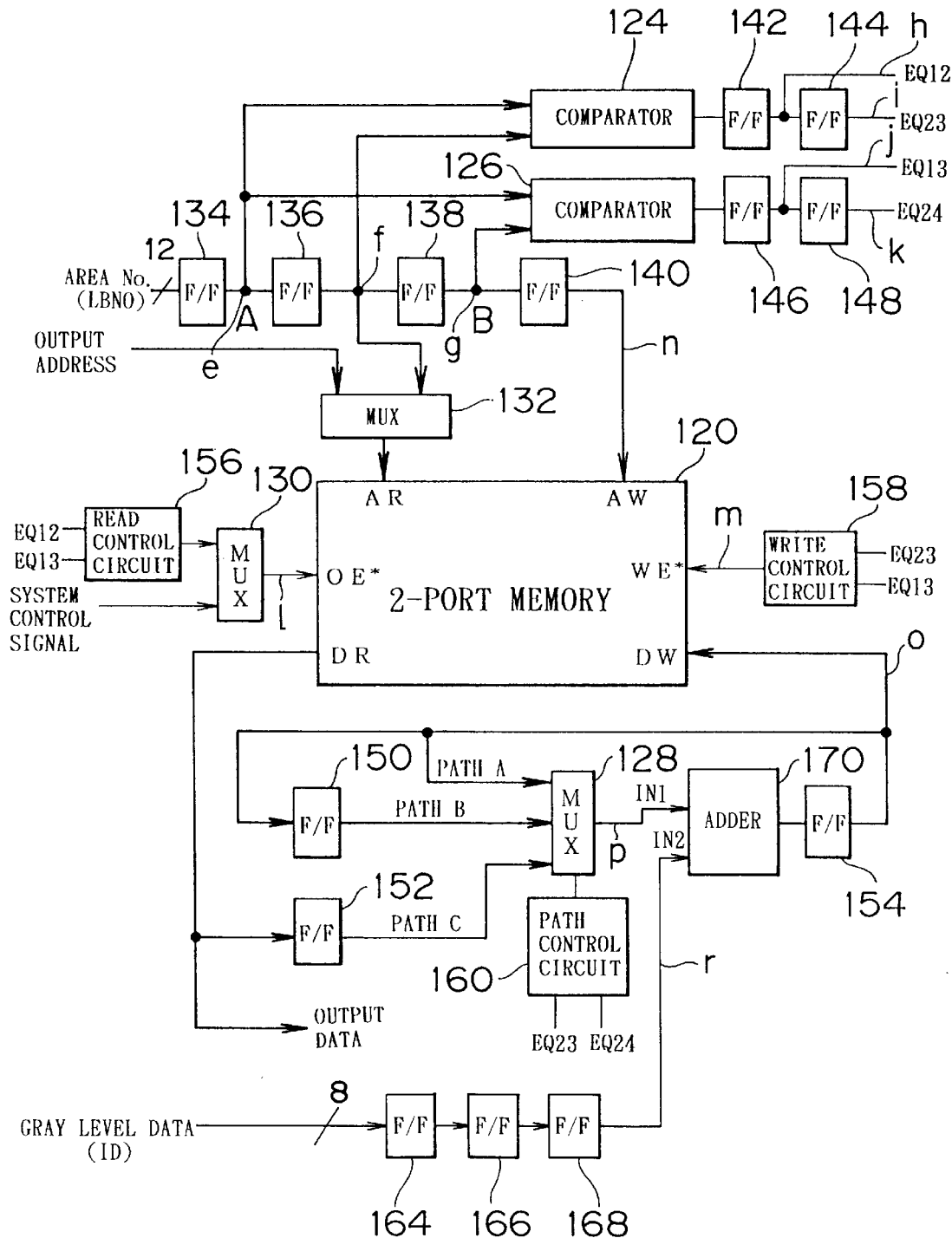
FIG. 11 is a block diagram showing an image processing apparatus of a second preferred embodiment according to the invention.

FIG. 11 shows an image processing apparatus according to a second preferred embodiment, generally for generating gray level accumulation for each area or segment. For avoiding repetitive description, components corresponding to the first preferred embodiment, shown in FIG. 6, are represented by the same symbols, and the detailed description thereof is omitted. In addition to the apparatus of the first preferred embodiment shown in FIG. 6, the apparatus of the second preferred embodiment further includes flip-flop circuits 164, 166 and 168, connected in series. Instead of the incrementor 122 of the first preferred embodiment, the apparatus includes an adder 170 to which output signals of the multiplexer 128 and the flip-flop circuit 168 are supplied, so that those signals are added to each other. The flip-flop circuit 134 is supplied with an area number of each area or segment in an image, while the flip-flop circuit 164 is supplied with gray level data of the corresponding pixel, defined by the area number simultaneously supplied to the flip-flop circuit 134.

In the second preferred embodiment shown in FIG. 11, the read control circuit 156 generates an output enabling signal in response to the output signals ("EQ12" and "EQ13") of the flip-flop circuit 142 and 146. In more detail, the read control circuit 156 supplies an output enabling signal of low level, active, when both the signals "EQ12" and "EQ13" are low in level, that is, when an output of the flip-flop circuit 136 is the same as none of outputs of the flip-flop circuits 138 and 140. Exceptionally, the read control circuit 156 supplies an output enabling signal of low level independently of the level of the signals "EQ12" and "EQ13", when the first effective area number is supplied as an address signal of the memory 120. Further, the read control circuit 156 also supplies an output enabling signal of low level independently of the level of the signal "EQ13" as long as the signal "EQ12" is low, when the second effective signal is supplied as an address signal of the memory 120. In other words, the read control circuit 156 supplies an output enabling signal of high level, inactive, independently of the level of "EQ13" as long as the signal "EQ12" is high, when the second effective signal is supplied as an address signal of the memory 120.

The write control circuit 158 generates a write enabling signal in response to the output signals ("EQ23" and "EQ13") of the flip-flop circuit 144 and 146. In more detail, the write control circuit 158 supplies a write enabling signal of low level, active, when both the signals "EQ23" and "EQ13" are low in level, that is, when an output of the flip-flop circuit 140 is the same as none of outputs of the flip-flop circuits 136 and 138. Exceptionally, the write control circuit 158 supplies an output enabling signal of low level independently of the level of the signals "EQ23" and "EQ13", when the last effective signal (LBNO) is supplied as an address signal of the memory 120. Further, the write control circuit 158 also supplies an output enabling signal of low level independently of the level of the signal "EQ13" as long as the signal "EQ23" is low, when the second last signal is supplied as an address signal of the memory 120. In other words, the write control circuit 158 supplies an output enabling signal of high level, inactive, independently of the level of the signal "EQ13" as long as the signal "EQ23" is high, when the second last signal is supplied as an address signal of the memory 120.

The path control circuit 160 controls the multiplexer 128 in response to the output signals "EQ23" and "EQ24" of the flip-flop circuits 144 and 148. In more detail, the path control circuit 160 makes the multiplexer 128 connect the output of the flip-flop 154 to the adder 170 independently of the level of the signal "EQ24", as long as the signal "EQ23" is high, that is, when outputs of the flip-flop circuits 136 and 138 are the same in level as each other. The path control circuit 160 makes the multiplexer 128 connect the output of the flip-flop circuit 150 to the adder 170 when the signals "EQ23" and "EQ24" are low and high, respectively, that is, when the flip-flop circuits 136 and 138 have the different outputs and the flip-flop circuit 136 and 140 have the same outputs. The path control circuit 160 makes the multiplexer 128 connect the output of the flip-flop 152 to the adder 170 when both the signals "EQ23" and "EQ24" are low, that is, when the flip-flop circuits 136 and 138 have the different outputs and the flip-flop circuits 136 and 140 have the different outputs as well. Exceptionally, the path control circuit 160 makes the multiplexer 128 connect the output of the flip-flop circuit 152 to the adder 170 independently of the levels of the signals "EQ23" and "EQ24" when the first effective data are held by the flip-flop circuit 138. Further, the path control circuit 160 makes the multiplexer 128 connect the output of the flip-flop 152 to the adder 170 independently of the level of the signal "EQ24" as long as the signal "EQ23" is low in level when the second effective data are held by the flip-flop circuit 138.

Figure 12:
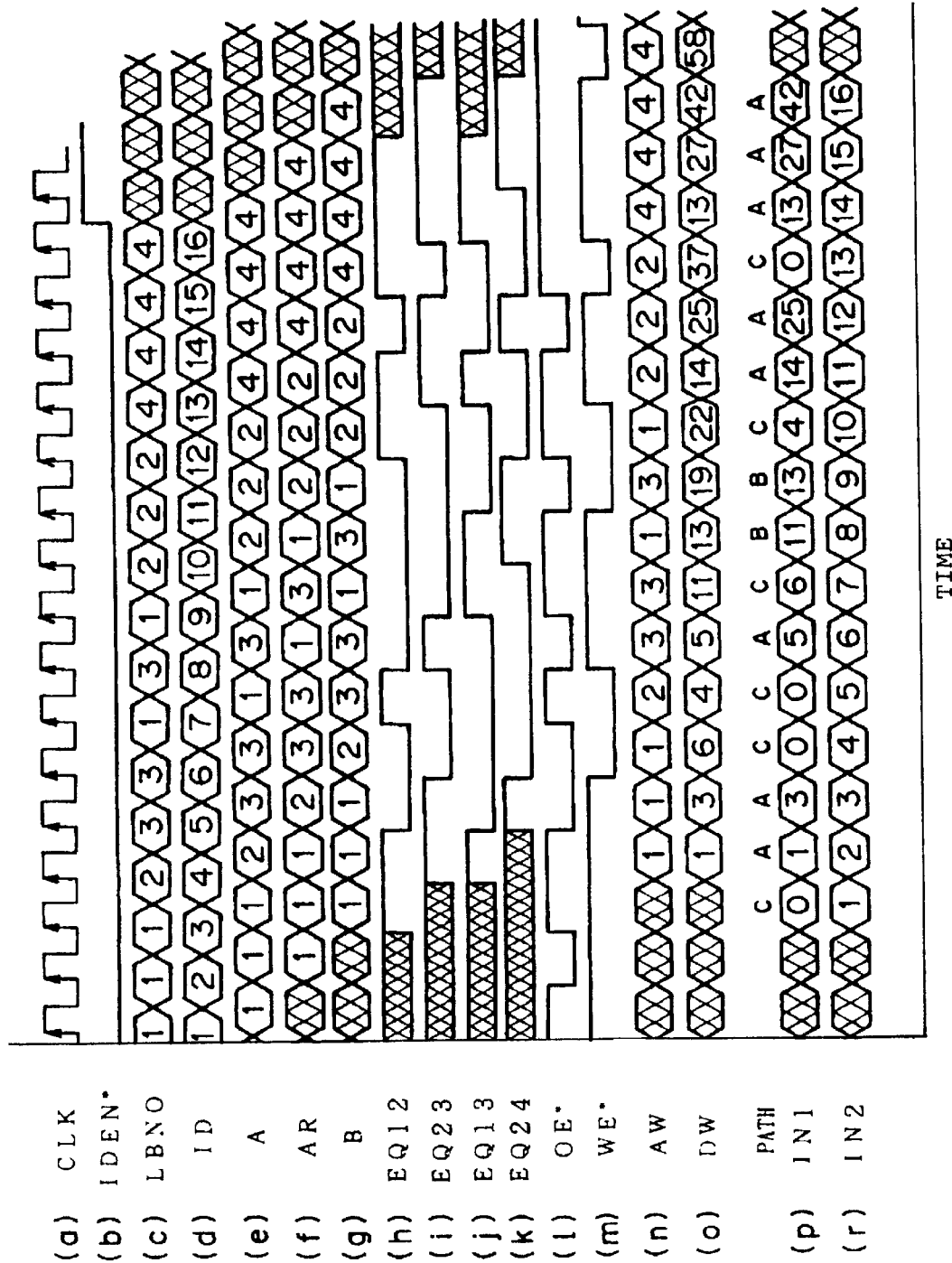
FIG. 12 is a flow chart describing operation of the second preferred embodiment.

FIG. 12 is a time-chart for generating a gray level accumulation for each area in the image, according to the second preferred embodiment shown in FIG. 11. In the figure, symbols "CLK" at (a), "LBNO" at (c) and "ID" at (d) represent image clock signal, an area number and gray level data, respectively. A signal "IDEN*" at (b) represents whether the signal "LBNO" and gray level data "ID" are effective or not, that is, gray level data "ID" are processed when the signal "IDEN*" is active, low level. Symbols "A" at (e), "AR" at (f), "B" at (g), "AW" at (n) and "DW" at (o) respectively represent an output of the flip-flop circuit 134, an output of the flip-flop circuit 136 that is a read address of the memory 120, an output of the flip-flop circuit 138, an output of the flip-flop circuit 140 that is a write address of the memory 120, and data to be written to the memory 120, that is the output of the flip-flop circuit 154. Symbols "IN1" at (p) and "IN2" at (r) respectively represent an input of the adder 170 that is an output of the multiplexer 128, and an output of the flip-flop circuit 168. Numerals shown within waveforms represent the corresponding data values indicated by the decimal system.

In operation, when the present gray level data (ID) and the present area number are provided in synchronization with the image clock signal "CLK", the present area number is compared with the last and the second last area numbers, provided one and two clocks prior to the present area number, respectively. When the present area number supplied as a read address is the same as none of the two previous (the last and second last) area numbers, a unit of data specified by the present area number (address signal) is read from the memory 120 and held by the flip-flop circuit 152. In other words, when the output of the flip-flop circuit 136 is the same as none of the output of the flip-flop circuit 138 and the output of the flip-flop circuit 140, that is, when both signals "EQ12" and "EQ13" are low in level, the data specified by the present gray level data (address signal) are read from the memory 120.

In next cycle ("EQ23"="EQ24"=LOW), the path control circuit 160 controls the multiplexer 128 to transmit an output signal of the flip-flop circuit 152 to the adder 170.

If the present area number, which is an address signal for the memory 120, is the same as the last area number, provided one clock prior to the present area number, no data corresponding to the present area number are read from the two-port memory 120, because the corresponding data are held by the flip-flop circuit 154. In other words, if the output of the flip-flop circuit 136 is equal to the output of the flip-flop circuit 138, that is when the signal "EQ12" is high in level, no data corresponding to the present area number are read from the memory 120. Subsequently, the output of the flip-flop circuit 154 is transmitted to the adder 170 in the next cycle where the signal "EQ23" becomes high in level.

If the present area number is equal to the second last area number, provided two clocks prior to the present area number, but different from the last area number, provided one clock prior to the present area number, no data corresponding to the present area number, are read from the memory 120, because the corresponding data are held by the flip-flop circuit 150. In other words, if the output of the flip-flop circuit 136 is equal to the output of the flip-flop circuit 140, but different from the output of the flip-flop circuit 138, that is, signals "EQ13" and "EQ12" are high and low in level, respectively, no data corresponding to the present area number are read from the memory 120. Subsequently, the output of the flip-flop circuit 150 is transmitted to the adder 170 in the next cycle where the signals "EQ24" and "EQ23" become high and low in level, respectively.

In writing operation to the two-port memory 120, when the output of the flip-flop 140 is equal to none of the outputs of the flip-flop circuits 136 and 138, that is, when both the signals "EQ23" and "EQ13" are low in level, the output of the flip-flop circuit 154 is written to the two-port memory 120. In another case where the outputs of the flip-flop circuits 140 and 138 are equal to each other, that is when the signal "EQ23" is high in level, no data are written to the two-port memory 120, because the corresponding data can be written in the following cycle. In another case where the outputs of the flip-flop circuits 140 and 136 are equal to each other, that is when the signal "EQ13" is high in level, no data are written to the two-port memory 120, because the corresponding data can be written two cycle later. By repeating thus operation, gray level accumulation for each area is automatically generated in the memory 120, and the gray level accumulation for each area is outputted from the two-port memory 120 by controlling the multiplexers 130 and 132.

According to the second preferred embodiment shown in FIG. 11, real-time processing for generating gray level accumulation for each area can be realized. Further, a clock cycle time can be around the longest time in reading time, writing time and adding time, that is more than two times faster than that of the conventional technology shown in FIG. 1. In addition, the second preferred embodiment only needs six times reading and six times writing of data to the memory 120 in order to perform the processing shown in FIG. 12. On the other hand, according to each of the conventional technology shown in FIGS. 1 and 3, sixteen times reading and sixteen times writing of data to the memory is required to carry out the processing shown in FIG. 12. Simply, the second preferred embodiment only needs six sixteenths (6/16) of power consumption of the memory relative to that by the conventional technology.

In the second preferred embodiment shown in FIG. 11, if gray level data for each area are supplied to the flip-flop circuit 134 and a value "1" is supplied to the flip-flop 164, a gray level histogram of the image can be generated as well as the first preferred embodiment shown in FIG. 6. If gray level data for each area are supplied to the flip-flop circuit 134 and frequency weighted data of the gray level are supplied to the flip-flop circuit 164, a frequency weighted gray level histogram of the image can be generated.

Figure 13:
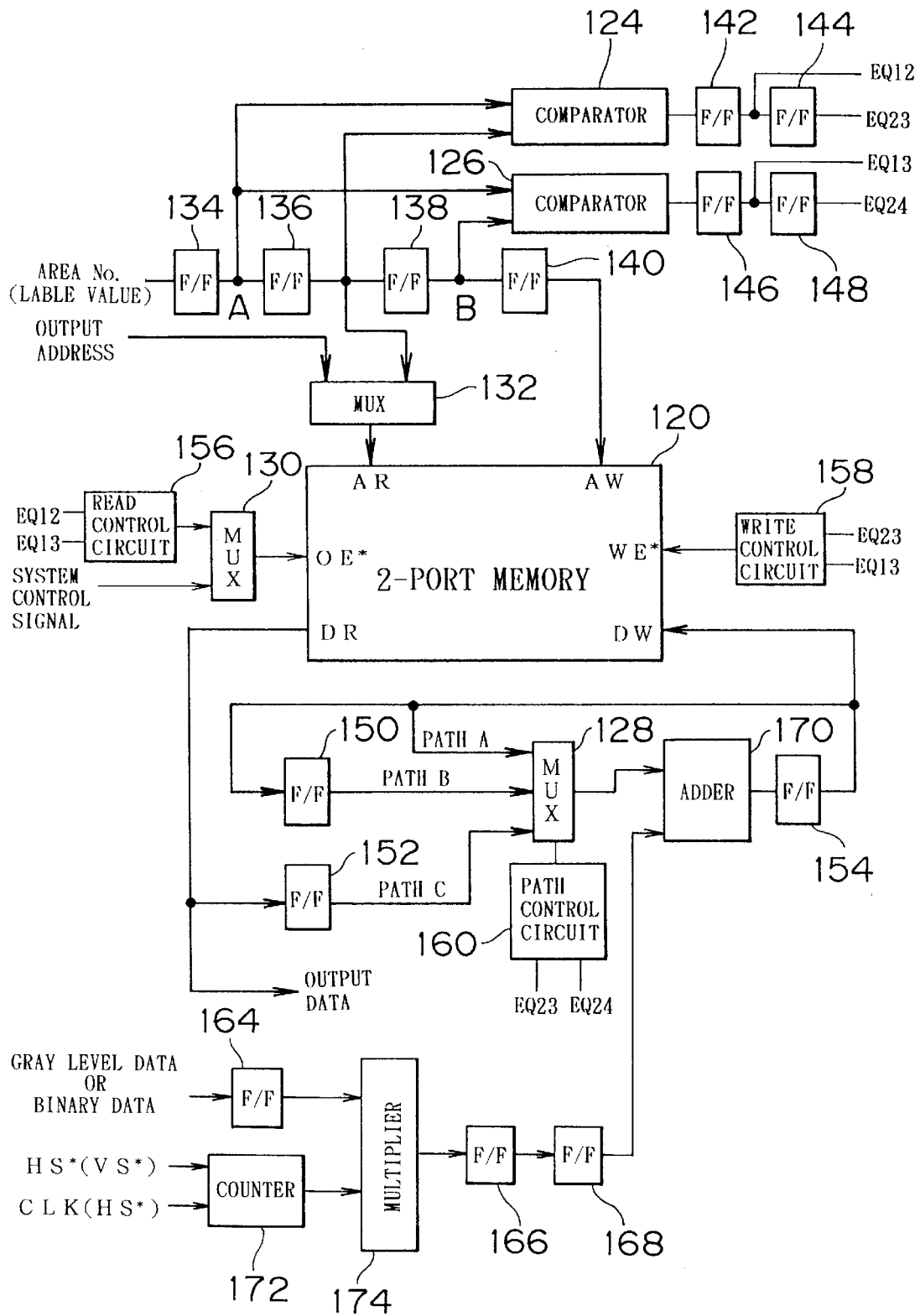
FIG. 13 is a block diagram showing an image processing apparatus of a third preferred embodiment according to the invention.

FIG. 13 shows an image processing apparatus according to a third preferred embodiment, used generally for generating an angular first moment for each area or segment in an image. For avoiding repetitive description, components corresponding to the first and second preferred embodiments, shown in FIGS. 6 to 12, are represented by the same symbols, and the detailed description thereof is omitted. In addition to the apparatus of the second preferred embodiment shown in FIG. 11, the apparatus of the third preferred embodiment further includes a counter 172 and a multiplier 174. The counter 172 is supplied with image clock signals "CLK" and horizontal synchronizing signals "HS*". The counter 172 counts the image clock signals "CLK" and is cleared by the horizontal synchronizing signal "HS*", so that the X-coordinate of a pixel currently entered is obtained. A cycle of the horizontal synchronizing signal "HS*" corresponds to a line of the image, so that the X-coordinate of a pixel is generated for each line by clearing the counter 172 with the horizontal synchronizing signal "HS*". The multiplier 174 is connected at an input to the counter 172 and at an output of the flip-flop circuit 166. The multiplier 174 is supplied with an output of the flip-flop circuit 164 as the other input. The multiplier 174 multiplies the output "f(x,y)" of the flip-flop circuit 164, that is gray level data or binary data for each area, and the output of the counter 172, that is the X-coordinate "x" of the gray level data, to obtain a signal "x·f(x,y)". By repeating thus operation to every pixel of the image, gray level accumulation of "x·f(x,y)" for each area, that is an X-angular first moment for each area is generated as "$\Sigma_y \Sigma_x \cdot f(x,y)$".

In the apparatus shown in FIG. 13, if the counter 172 counts horizontal synchronizing signals "HS*" instead of the image clock "CLK" and is cleared by a vertical synchronizing signal "VS*", the Y-coordinate of the pixel is obtained. In this case, the multiplier 174 multiplies the output of the flip-flop circuit 164, that is gray level data "f(x,y)", or binary data, for each pixel and the Y-coordinate of the area "y". By repeating thus operation to every pixel in the image, gray level accumulation of "y·f(x,y)" for each area, that is a Y-angular first moment for each area is generated as "$\Sigma_y \Sigma_x y \cdot f(x,y)$".

Figure 14:
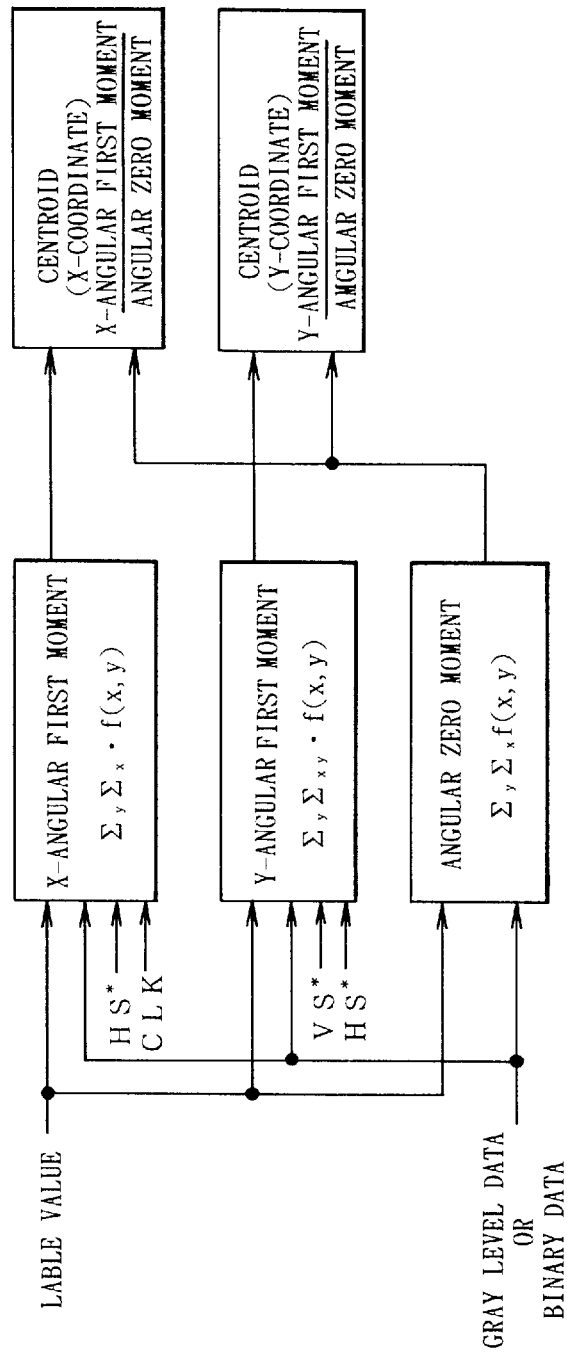
FIG. 14 is a block diagram showing arithmetic operation of the third preferred embodiment.

On the other hand, in the second preferred embodiment, an angular zero moment is generated for each area, as "$\Sigma_y \Sigma_x f(x,y)$". As shown in FIG. 14, according to the second and third preferred embodiments, the centroid of the image can be obtained at a high speed based on an angular zero moment, generated by the apparatus shown in FIG. 11, and an angular first moment, generated by the apparatus shown in FIG. 13.

Figure 15:
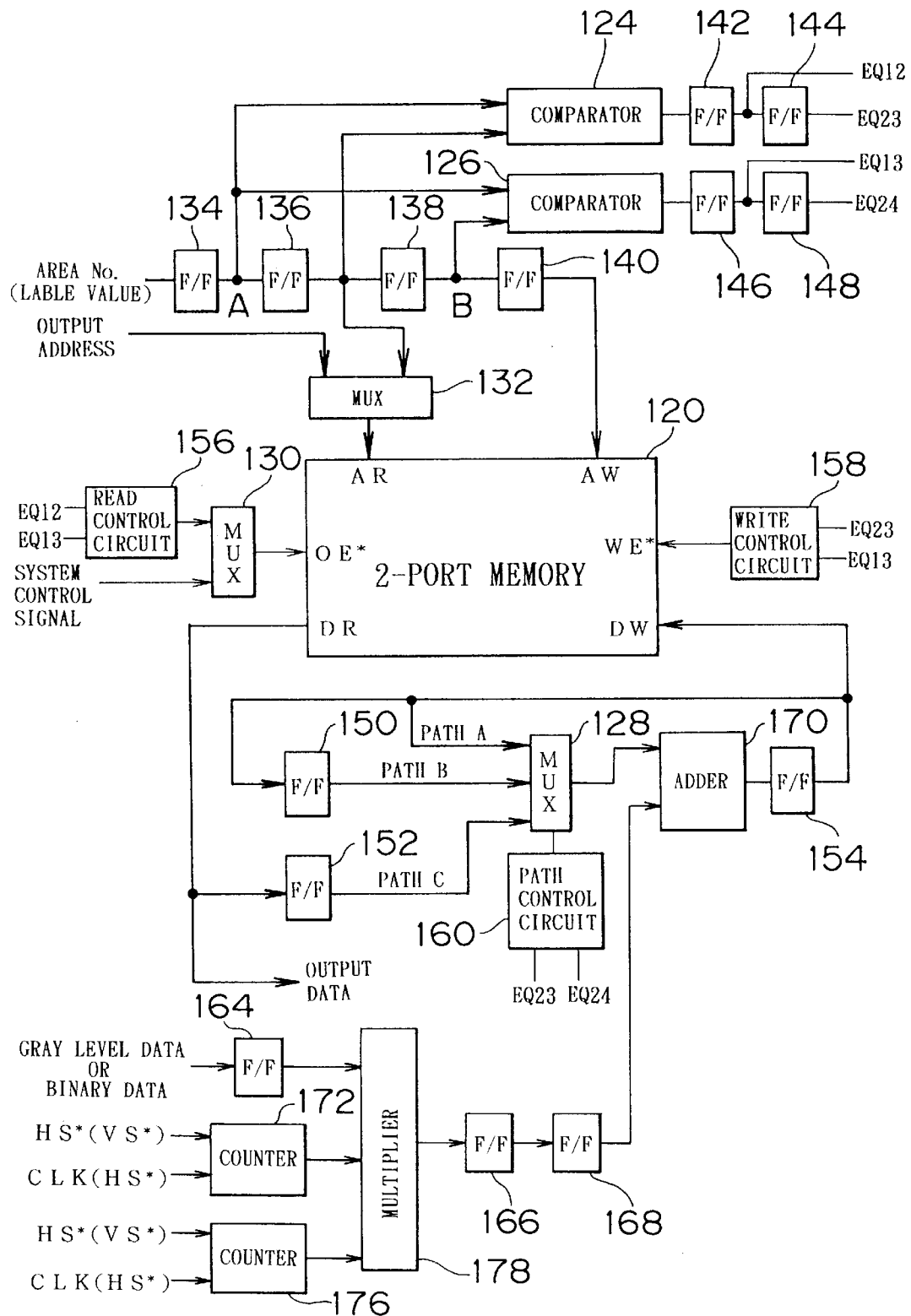
FIG. 15 is a block diagram showing an image processing apparatus of a fourth preferred embodiment according to the invention.

FIG. 15 shows an image processing apparatus according to a fourth preferred embodiment, used generally for generating an angular second moment for each area or segment in an image. For avoiding repetitive description, components corresponding to the first to third preferred embodiment, shown in FIGS. 6 to 14, are represented by the same symbols, and the detailed description thereof is omitted. In addition to the apparatus of the third preferred embodiment shown in FIG. 13, the apparatus of the fourth preferred embodiment further includes a counter 176 and a multiplier 178 instead of the multiplier 174 in the third preferred embodiment. The counter 176 is supplied with image clock signals "CLK" and horizontal synchronizing signals "HS*".

In the same manner as the counter 172, the counter 176 counts the image clock signals "CLK" and is cleared by the horizontal synchronizing signal "HS*", so that the X-coordinate of a pixel currently entered is obtained. A cycle of the horizontal synchronizing signal "HS*" corresponds to a line of the image, so that the X-coordinate of a pixel is generated for each line by clearing the counter 176 with the horizontal synchronizing signal "HS*". The multiplier 178 is connected at input terminals to the flip-flop circuit 164 and both the counters 172 and 176. The multiplier 178 multiplies the output "f(x,y)" of the flip-flop circuit 164, that is gray level data or binary data for each pixel, and the square of the outputs of the counters 172 and 176, that is the square "$x^2$" of X-coordinate "x" of the gray level data, to obtain data "$x^2 \cdot f(x,y)$". By repeating thus operation to every pixel in the image, accumulation of "$x^2 \cdot f(x,y)$" for each pixel, that is an X-angular second moment for each area is generated as "$\Sigma_y \Sigma_x x^2 \cdot f(x,y)$".

In the apparatus shown in FIG. 15, if the counter 172 counts the image clock signals "CLK" and clears it with horizontal synchronizing signals "HS*" of gray level data, and the counter 178 counts the horizontal synchronizing signals "HS*" instead of the image clock "CL" and clears it with a vertical synchronizing signal "VS*", an XY-angular second moment for each area is generated as "$\Sigma_y \Sigma_x x \cdot y \cdot f(x,y)$".

Figure 16:
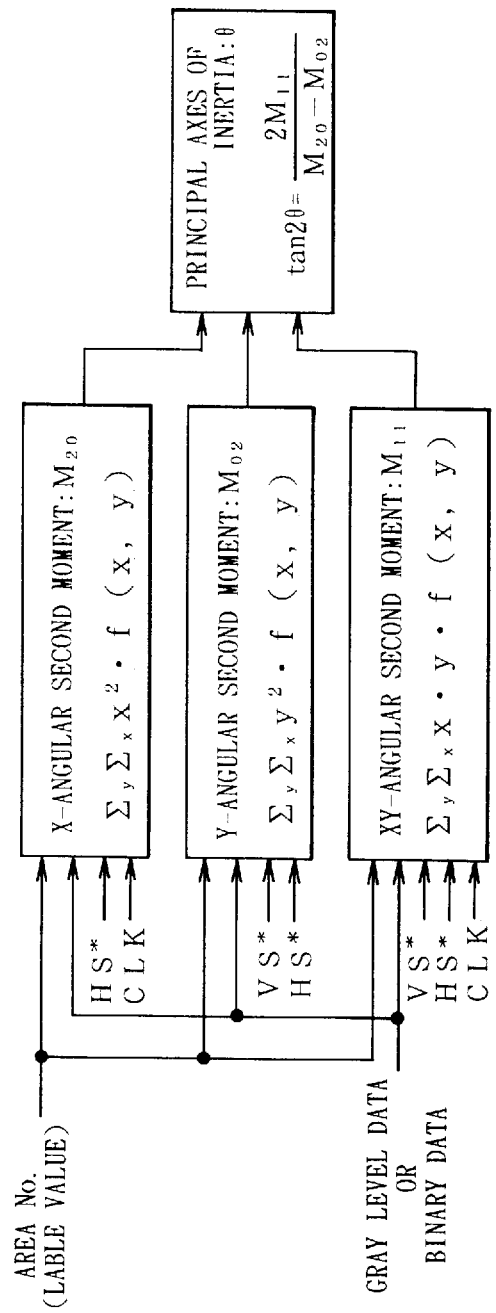
FIG. 16 is a block diagram showing arithmetic operation of the fourth preferred embodiment.

As shown in FIG. 16, according to the fourth preferred embodiment, principal axes of inertia for each area can be generated at high speed.

Although the invention has been described with respect to the specific embodiments for complete and clear disclosure, the appended claims are not be thus limited but are to be construed as embodying all modification and alternative constructions that may occur to one skilled in the art which fairly fall within the basic teaching herein set forth.

We claim:

1. An image processing apparatus, comprising:
   a memory which is accessed in response to address signals;

a comparator which compares an objective address signal with at least one preceding address signal, provided prior to said objective address signal, to obtain a control signal;

means responsive to said objective address signal for reading the corresponding unit of data from said memory;

a processor which performs predetermined processing to said unit of data read from said memory to obtain renewal data;

means for writing said renewal data to the original address thereof in said memory; and a controller responsive to said control signal for controlling access of said reading means and said writing means to said memory;

wherein said comparator supplies said control signal when said objective address signal is equal to said preceding address signal, and said controller, in response to said control signal, disables said reading means to read said unit of data, and disables said writing means to write renewal data obtained by processing a unit of data corresponding to said preceding address signal.

2. The apparatus according to claim 1, wherein, said memory includes a read port and a write port, said comparator compares said objective address signal with first and second preceding address signals, provided one and two steps prior to said address signal, respectively, and said controller includes,
  (1) a first flip-flop circuit which holds said unit of data read from said memory in response to said objective address signal;
  (2) a second flip-flop circuit which holds said renewal data, to be written to said memory;
  (3) a third flip-flop circuit which holds an output of said second flip-flop circuit,
  (4) a selector which selects, in response to said control signal, one signal from output signals of said first, second and third flip-flop circuits, so that said selected signal is supplied to said processor;
  (5) a read control circuit responsive to said control signal for supplying enabling and disabling signals to said read port of said memory; and
  (6) a write control circuit responsive to said control signal for supplying enabling and disabling signals to said write port of said memory.

3. An image processing apparatus, which processes an image composed of a plurality of pixels each represented by a gray level comprising:

a memory which stores image related data, said memory being provided with a read port and a write port;

an address generator which provides address signals, each representing a gray level of the corresponding pixel in said image;

a comparator which compares an objective address signal with at least one preceding address signal, provided prior to said objective address signal, to obtain a control signal;

means responsive to said objective address signal for reading the corresponding unit of data from said memory;

a processor which increments said unit of data read from said memory to obtain renewal data;

means for writing said renewal data to the original address thereof in said memory; and a controller responsive to said control signal for controlling access of said reading means and said writing means to said memory;

wherein said reading means finally reads data stored in said memory to generate a gray level histogram of said image;

wherein said comparator supplies said control signal when said objective address signal is equal to said preceding address signal; and wherein said controller, in response to said control signal, disables said reading means to read said unit of data, and disables said writing means to write renewal data obtained by processing a unit of data corresponding to said preceding address signal.

4. The apparatus according to claim 3, wherein, said comparator compares said objective address signal with first and second preceding address signals, provided one and two steps prior to said objective address signal, respectively, and said controller includes,
  (1) a first flip-flop circuit which holds said unit of data read from said memory in response to said objective address signal;
  (2) a second flip-flop circuit which holds said renewal data, to be written to said memory;
  (3) a third flip-flop circuit which holds an output of said second flip-flop circuit,
  (4) a selector which selects, in response to said control signal, one signal from output signals of said first, second and third flip-flop circuits, so that said selected signal is supplied to said processor;
  (5) a read control circuit responsive to said control signal for supplying enabling and disabling signals to said read port of said memory; and
  (6) a write control circuit responsive to said control signal for supplying enabling and disabling signals to said write port of said memory.

5. An image processing apparatus, which processes an image composed of a plurality of pixels each represented by a gray level and an area number, comprising:

a memory which stores image related data, said memory being provided with a read port and a write port;

an address generator which provides address signals, each representing an area in said image;

a comparator which compares an objective address signal with at least one preceding address signal, provided prior to said objective address signal, to obtain a control signal;

means responsive to said objective address signal for reading the corresponding unit of data from said memory;

means for providing gray level data representing a gray level of said area represented by said objective address signal;

a processor which adds said gray level data to said unit of data read from said memory to provide renewal data;

means for writing said renewal data to the original address thereof in said memory; and a controller responsive to said control signal for controlling access of said reading means and said writing means to said memory wherein, said reading means finally reads data stored in said memory to provide output data indicating accumulation of gray level for each area in said image.

6. An image processing apparatus, which processes an image composed of a plurality of pixels each represented by a gray level and an area number, comprising:

a memory which stores image related data, said memory being provided with a read port and a write port;

an address generator which provides address signals, each representing an area in said image;

a comparator which compares an objective address signal with at least one preceding address signal, provided prior to said objective address signal, to obtain a control signal;

means responsive to said objective address signal for reading the corresponding unit of data from said memory;

means for providing gray level data representing a gray level of said area represented by said objective address signal;

a processor which adds said gray level data to said unit of data read from said memory to provide renewal data;

means for writing said renewal data to the original address thereof in said memory; and a controller responsive to said control signal for controlling access of said reading means and said writing means to said memory wherein:

said comparator supplies said control signal when said objective address signal is equal to said preceding address signal, and said controller, in response to said control signal, disables said reading means to read said unit of data, and disables said writing means to write renewal data obtained by processing a unit of data corresponding to said preceding address signal.

7. An image processing apparatus, which processes an image composed of a plurality of pixels each represented by a gray level and an area number, comprising:

a memory which stores image related data, said memory being provided with a read port and a write port;

an address generator which provides address signals, each representing an area in said image;

a comparator which compares an objective address signal with at least one preceding address signal, provided prior to said objective address signal, to obtain a control signal;

means responsive to said objective address signal for reading the corresponding unit of data from said memory;

means for providing gray level data representing a gray level of said area represented by said objective address signal;

a processor which adds said gray level data to said unit of data read from said memory to provide renewal data;

means for writing said renewal data to the original address thereof in said memory; and a controller responsive to said control signal for controlling access of said reading means and said writing means to said memory;

wherein, said comparator compares said objective address signal with first and second preceding address signals, provided one and two steps prior to said objective address signal, respectively, and said controller includes, (1) a first flip-flop circuit which holds said unit of data read from said memory in response to said objective address signal;

(2) a second flip-flop circuit which holds said renewal data, to be written to said memory;

(3) a third flip-flop circuit which holds an output of said second flip-flop circuit;

(4) a selector which selects, in response to said control signal, one signal from output signals of said first, second and third flip-flop circuits, so that said selected signal is supplied to said processor;

(5) a read control circuit responsive to said control signal for supplying enabling and disabling signals to said read port of said memory; and (6) a write control circuit responsive to said control signal for supplying enabling and disabling signals to said write port of said memory.

8. An image processing apparatus, which processes an image composed of a plurality of pixels each represented by a gray level and an area number, comprising:

a memory which stores image related data, said memory being provided with a read port and a write port;

an address generator which provides address signals, each representing an area in said image;

a comparator which compares an objective address signal with at least one preceding address signal, provided prior to said objective address signal, to obtain a control signal;

means responsive to said objective address signal for reading the corresponding unit of data from said memory;

means for providing gray level data representing a gray level of said area represented by said objective address signal;

a processor which adds said gray level data to said unit of data read from said memory to provide renewal data;

means for writing said renewal data to the original address thereof in said memory; and a controller responsive to said control signal for controlling access of said reading means and said writing means to said memory;

further comprising:

a coordinate generator which generates coordinate signals, synchronizing input of said address signals and said gray level data;

a counter which counts said coordinate signals; and a multiplier which multiplies the output of said counter and said count and said gray level data, representing a gray level of said area represented by said objective address signal, wherein, said processor adds said multiplied data, instead of said gray level data, to said unit of data read from said memory to provide said renewal data.

9. The apparatus according to claim 8, wherein, said reading means finally reads data stored in said memory to provide an angular first-moment for each area in said image.

10. The apparatus according to claim 8, wherein, said counter includes first and second counter circuits each counting said coordinate signals, said multiplier multiplies said gray level data, representing a gray level of said area represented by said objective address signal, the output of said first counter circuit and the output of said second counter circuit, and said reading means finally reads said image related data stored in said memory to provide an angular second-moment for each area in said image.

* * * * *